United States Patent
Wacker

(10) Patent No.: US 11,213,942 B1
(45) Date of Patent: Jan. 4, 2022

(54) TOOL ORGANIZER AND TOOL ORGANIZER MODULE

(71) Applicant: James H Wacker, Albion, IN (US)

(72) Inventor: James H Wacker, Albion, IN (US)

(*) Notice: Subject to any disclaimer, the term of this patent is extended or adjusted under 35 U.S.C. 154(b) by 0 days.

(21) Appl. No.: 17/079,478

(22) Filed: Oct. 25, 2020

Related U.S. Application Data

(63) Continuation of application No. 15/785,099, filed on Oct. 16, 2017, now Pat. No. 10,843,328.

(60) Provisional application No. 62/409,026, filed on Oct. 17, 2016.

(51) Int. Cl.
*B25H 3/04* (2006.01)
*F16B 1/00* (2006.01)

(52) U.S. Cl.
CPC .............. *B25H 3/04* (2013.01); *F16B 1/00* (2013.01); *F16B 2001/0035* (2013.01)

(58) Field of Classification Search
CPC ....... B25H 3/04; F16B 1/00; F16B 2001/0035
See application file for complete search history.

(56) References Cited

U.S. PATENT DOCUMENTS

| | | | |
|---|---|---|---|
| 2,565,624 A * | 8/1951 | Phelon | A47G 21/14 335/285 |
| 2,580,099 A * | 12/1951 | Jaeger | B25H 3/04 335/285 |
| 2,697,804 A * | 12/1954 | Phelon | B25H 3/04 335/285 |
| 2,966,992 A * | 1/1961 | Dunkelberger | B25H 3/04 211/70.7 |
| 3,109,619 A | 11/1963 | Krug et al. | |
| 3,195,021 A * | 7/1965 | Martin | A47J 47/16 335/285 |
| 3,229,820 A * | 1/1966 | Hentzi | B25H 3/04 211/70.6 |
| 3,419,832 A * | 12/1968 | Baermann | B25H 3/04 335/285 |
| 3,827,021 A * | 7/1974 | Phelon | A47J 47/16 335/285 |
| 3,842,980 A * | 10/1974 | Kushner | H01F 7/0215 248/205.3 |
| 4,043,453 A | 8/1977 | Greenlee | |
| 4,337,860 A | 7/1982 | Carrigan | |
| 4,451,810 A * | 5/1984 | Miller | H01F 7/0215 248/206.5 |
| 4,586,616 A * | 5/1986 | Cooper | A47J 47/16 211/88.04 |
| 4,591,817 A * | 5/1986 | Miller | H01F 7/0215 335/285 |
| 5,284,245 A | 2/1994 | Slivon et al. | |

(Continued)

*Primary Examiner* — Stanton L Krycinski

(57) ABSTRACT

In an example, a tool organizer module includes a base including an opening formed at a first side of the base and a feature formed at a second side of the base, to receive a portion of a tool and a magnet disposed in the opening of the base, wherein the feature includes a recession in the second side of the base, and wherein the magnet is disposed to impart, on the second side of the base, a magnetic retention force at least substantially centered about the feature to retain the tool to the second side of the base in the feature for any orientation of the portable tool organizer module and to impart, on the first side of the base, a magnetic retention force to retain the base to a selected surface.

21 Claims, 7 Drawing Sheets

(56) References Cited

U.S. PATENT DOCUMENTS

| | | | |
|---|---|---|---|
| 5,301,822 A * | 4/1994 | Coleman | B25H 3/04 |
| | | | 211/70.6 |
| 5,500,631 A | 3/1996 | Negus | |
| 5,542,320 A | 8/1996 | Vasichek et al. | |
| 5,660,276 A * | 8/1997 | Winnard | B25H 3/06 |
| | | | 206/350 |
| 5,669,516 A * | 9/1997 | Horn | B25H 3/06 |
| | | | 211/70.6 |
| 5,695,165 A * | 12/1997 | Moriarty | B01L 9/54 |
| | | | 248/205.4 |
| 5,743,394 A | 4/1998 | Martin | |
| 5,855,285 A | 1/1999 | Laird et al. | |
| 5,975,297 A | 11/1999 | Kao | |
| 5,979,675 A | 11/1999 | Moriarty | |
| 6,006,906 A * | 12/1999 | Winnard | B25H 3/06 |
| | | | 206/350 |
| 6,073,766 A | 6/2000 | Winnard | |
| 6,450,338 B1 | 9/2002 | Chen | |
| 6,719,155 B1 * | 4/2004 | Chang | B25H 3/04 |
| | | | 206/350 |
| 6,811,127 B1 | 11/2004 | Shiao | |
| 6,923,317 B2 * | 8/2005 | Coleman, Jr. | B25H 3/003 |
| | | | 206/350 |
| 7,172,079 B1 * | 2/2007 | Shiao | B25H 3/04 |
| | | | 206/350 |
| 7,735,645 B2 * | 6/2010 | Joyce | B25H 3/003 |
| | | | 206/350 |
| 7,837,033 B2 | 11/2010 | Schein et al. | |
| 7,905,354 B1 | 3/2011 | Geibel | |
| 7,971,736 B1 * | 7/2011 | Stewart | A47G 21/14 |
| | | | 211/70.7 |
| 8,181,780 B1 | 5/2012 | Guffey et al. | |
| 8,733,562 B2 | 5/2014 | Kao | |
| 9,560,923 B1 * | 2/2017 | Winnard | B25H 3/04 |
| 10,413,092 B2 * | 9/2019 | Winnard | A47F 7/0021 |
| 10,716,413 B2 * | 7/2020 | Winnard | A47F 7/0021 |
| 2002/0130231 A1 | 9/2002 | Winnard | |
| 2004/0238466 A1 * | 12/2004 | Shiao | B25H 3/04 |
| | | | 211/70.6 |
| 2009/0218463 A1 * | 9/2009 | Winnard | B25H 3/04 |
| | | | 248/309.4 |
| 2009/0242433 A1 | 10/2009 | Van Bergen et al. | |
| 2011/0174752 A1 * | 7/2011 | Liao | A47F 5/0838 |
| | | | 211/70.6 |
| 2015/0034572 A1 * | 2/2015 | Kao | B25H 3/04 |
| | | | 211/13.1 |
| 2015/0202767 A1 * | 7/2015 | Kao | F16M 13/022 |
| | | | 211/70.6 |
| 2016/0016306 A1 * | 1/2016 | Haddon | B25H 5/00 |
| | | | 211/70.6 |
| 2018/0361564 A1 | 12/2018 | Hurley | |

\* cited by examiner

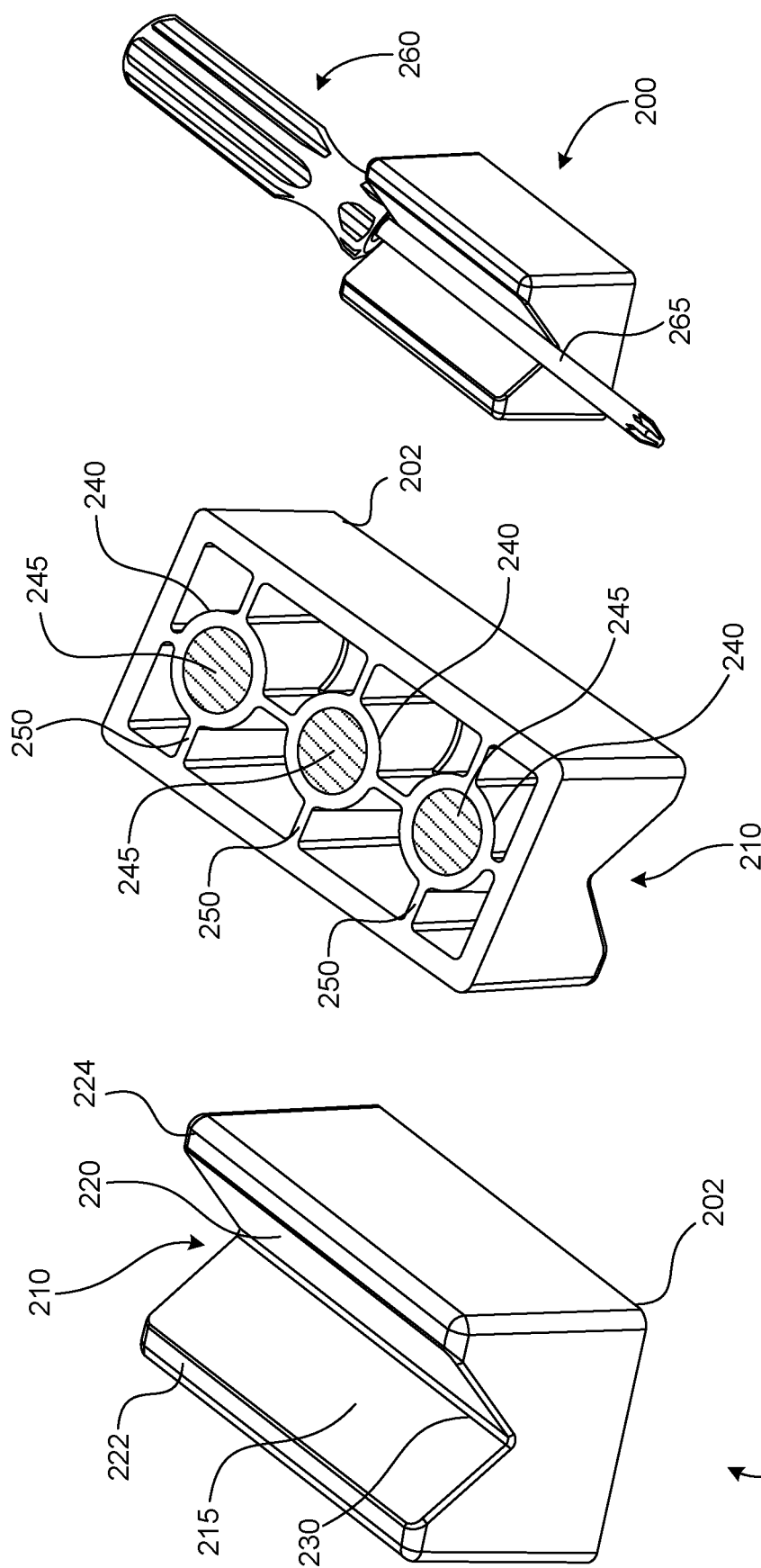

TOOL ORGANIZER AND TOOL ORGANIZER MODULE

CROSS REFERENCE TO RELATED APPLICATIONS

This application claims the benefit of, and priority to, U.S. Provisional Patent Application Ser. No. 62/409,026, titled "Tool Organizer and Tool Organizer Module," filed on Oct. 17, 2016, and U.S. patent application Ser. No. 15/785,099, titled "Tool Organizer and Tool Organizer Module," filed on Oct. 16, 2017, of which the present application is a continuation application, the entire contents of each of which are hereby incorporated by reference for all purposes.

This disclosure relates generally to tools, and, more particularly, to devices for organizing tools.

BACKGROUND

Tools are typically housed in a toolbox drawer or tray which may include partitions to define subsections in which tools such as screwdrivers, socket wrenches, sockets and the like may be arranged. When selected tools are required for a task, the entire toolbox is typically moved to the worksite.

BRIEF DESCRIPTION OF THE DRAWINGS

FIGS. 2A-2B are schematic illustrations of an example third tool organizer module constructed in accordance with teachings of this disclosure.

FIG. 2C is a schematic illustration of the example third tool organizer module of FIGS. 2A-2B, constructed in accordance with teachings of this disclosure, bearing an example tool.

Figure 1A:
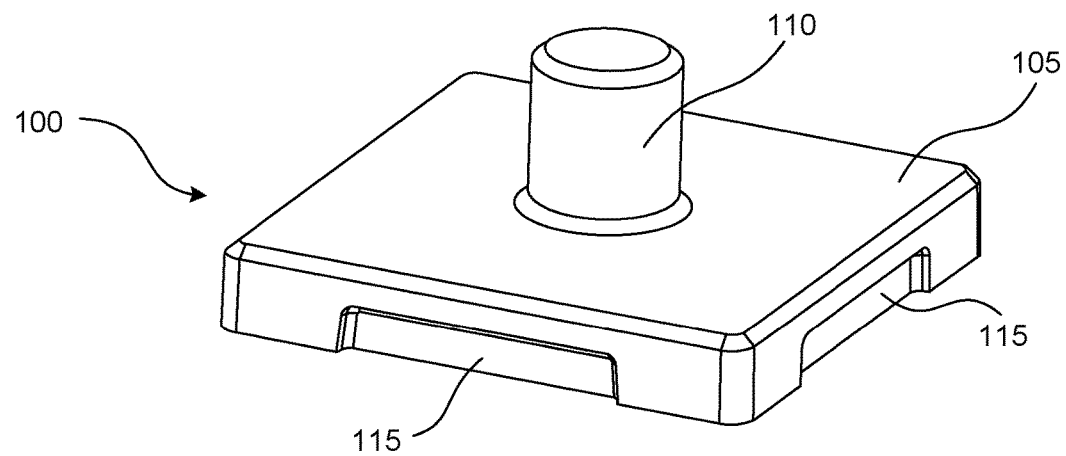
FIGS. 1A-1C are schematic illustrations of an example first tool organizer module constructed in accordance with teachings of this disclosure.

The figures are not to scale. Wherever possible, the same reference numbers will be used throughout the drawing(s) and accompanying written description to refer to the same or like parts. As used in this patent, stating that any part is in any way positioned on (e.g., positioned on, located on, disposed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Toolboxes can become quite cluttered and disorganized, particularly where there is a mismatch between a number of compartments within a toolbox and a number of and/or size of tools (e.g., socket wrenches, sockets, etc.) to be stored therein.

Figure 1B:
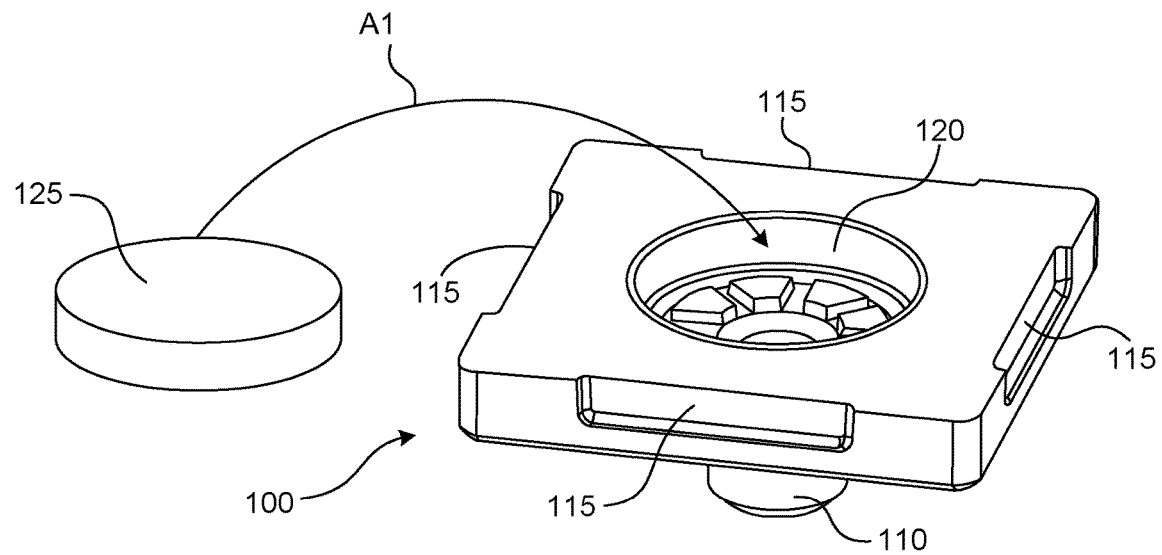
Figure 1C:
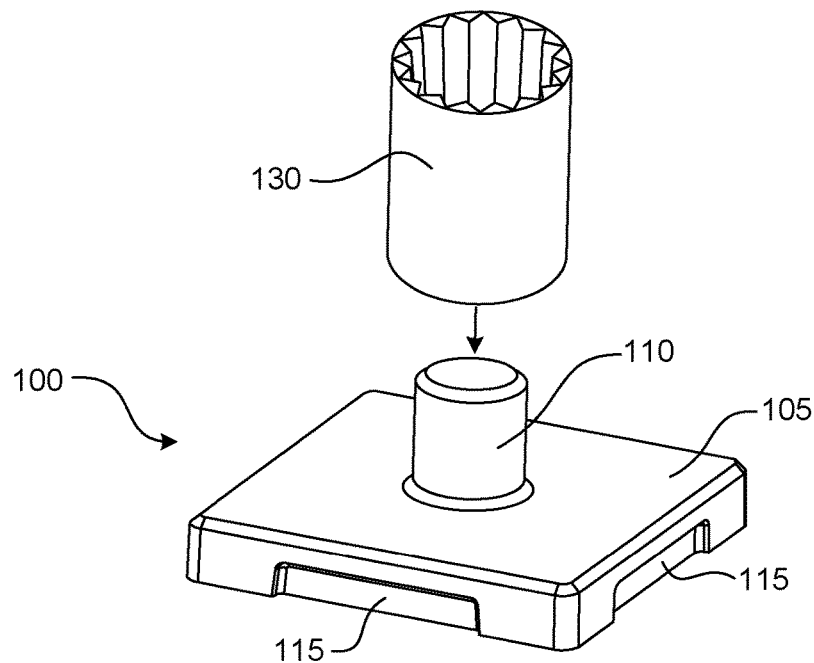

FIGS. 1A-1C are schematic illustrations of an example first tool organizer module 100 including an example base 105 defining one or more example features 110 to receive a portion of a tool. In some examples, the base 105 is square, such as is shown in FIGS. 1A-1C. In some examples, the base 105 is substantially square, rectangular, round, or polygonal, having three or more sides (e.g., triangular, pentagonal, octagonal, etc.).

In some examples, the feature 110 includes a post extending from an example upper surface of the base 105, such as is shown in FIGS. 1A-1D. In some examples, the feature 110 includes a recession in the upper portion corresponding in shape and size to a shape and size of a tool to be received therein. For instance, the feature 110 may include an annular recess in the upper portion dimensioned to receive a socket of a particular size (e.g., a 16 mm socket, a ¾" socket, etc.).

In some examples, the feature 110 includes a cylindrical post having an outer diameter corresponding to an inner diameter of the portion of the tool to be received. In some examples, the feature 110 includes a polygonal (e.g., a triangular, square, pentagonal, hexagonal, octagonal, 12-sided, etc.) post having an outer dimension corresponding to an inner dimension of the portion of the tool to be received. For instance, the feature 110 may be a square post corresponding in dimension to (e.g., slightly smaller than, etc.) a driver hole or square hole of a socket (e.g., ¼", ⅜", ½", ¾", 1", etc.) or a socket head (e.g., a 6-point socket head, a 12-point socket head, etc.). In some examples, the feature 110 includes a lobed shape (e.g., pentalobe, etc.), a cross-shape or a star-shape (e.g., a 6-pointed star, an 8-pointed star, etc.). A length of the feature 110 may also vary to correspond to a desired application. For instance, a first tool organizer module 100 may include a feature 110 having a first length for a first tool 130 (e.g., a standard socket), a second length for a second tool 130 (e.g., a semi-deep socket) or a third length for a third tool 130 (e.g., a deep socket). In some examples, the first tool organizer module 100 and corresponding feature 110 are constructed to accommodate any type of socket or attachment for any socket drive wrench (e.g., standard, metric, deep-well, impact, Allen, Torx, drive extensions, etc.).

FIG. 1B shows the first tool organizer module 100 in an inverted position to show, at a bottom portion thereof, that the base 105 defines an example opening 120 to receive an example magnet 125. The magnet 125 is shown adjacent the base 105 of the first tool organizer module 100 and the arrow A1 indicates that the magnet 125 is to be inserted into the opening 120. In some examples, the base 105 defines a plurality of openings 120 to receive a corresponding plurality of magnets. In some examples, the magnet 125 is circular or cylindrical in shape. In some examples, the magnet 125 is a polygonal shape (e.g., square, etc.).

In some examples, the magnet 125 is retained within the opening via a friction fit or interference fit between a periphery of the magnet 125 and the surface of or surfaces of the opening 120. In some examples, the magnet 125 is retained within the opening via an adhesive applied to the magnet 125 and/or the surface(s) of the opening 120 prior to insertion of the magnet 125 into the opening 120. In some examples, a retainer (not shown) is attached to a bottom of the base 105 to retain the magnet 125 in the opening 120. In some examples, the retainer is connected to the bottom of the base 105 via an adhesive or via a snap-fit connection including one or more male-female connectors. For instance, the base 105 includes one or more connectors (e.g., female connector(s), male connector(s), a combination of male connector(s) and female connector(s)) positioned to matingly connect with one or more corresponding connectors (e.g., male connector(s), female connector(s), a combination of female connector(s) and male connector(s)) provided on the retainer. In some examples, the magnet 125 includes a rare-earth magnet (e.g., a neodymium magnet, etc.), an Alnico alloy or a ferrite. In some examples, the magnet 125 is integrally formed within the first tool organizer module 100.

In some examples, recesses 115 are formed in one or more sides of the first tool organizer module 100. In some examples, the recesses 115 facilitate handling of the first tool organizer module 100 and/or facilitate removal of the first tool organizer module 100 from a tool organizer, enabling improved purchase of the edges of the base 105. In the example first tool organizer module 100 of FIGS. 1A-1D, a recess 115 is formed in each side of the base 105.

FIG. 1C shows an example tool 130, a socket, moved into position on the feature 110, shown as a cylindrical post extending from an example upper surface of the base 105. In this example, a diameter of the feature 110 is substantially equal to a length of a side of a square hole at the driven end of the tool 130 (e.g., less than about ¼", less than about ⅜", less than about ½", etc.). In some examples, the feature 110 provides a clearance fit or a transition fit with the tool 130 enabling the tool 130 to be readily assembled with and disassembled from the feature 110 while still providing securement of the tool 130 about the feature 110. In some examples, where the tool 130 is itself ferrous, ferritic or magnetic, an additional retention force is imparted by the magnet 125.

Figure 1D:
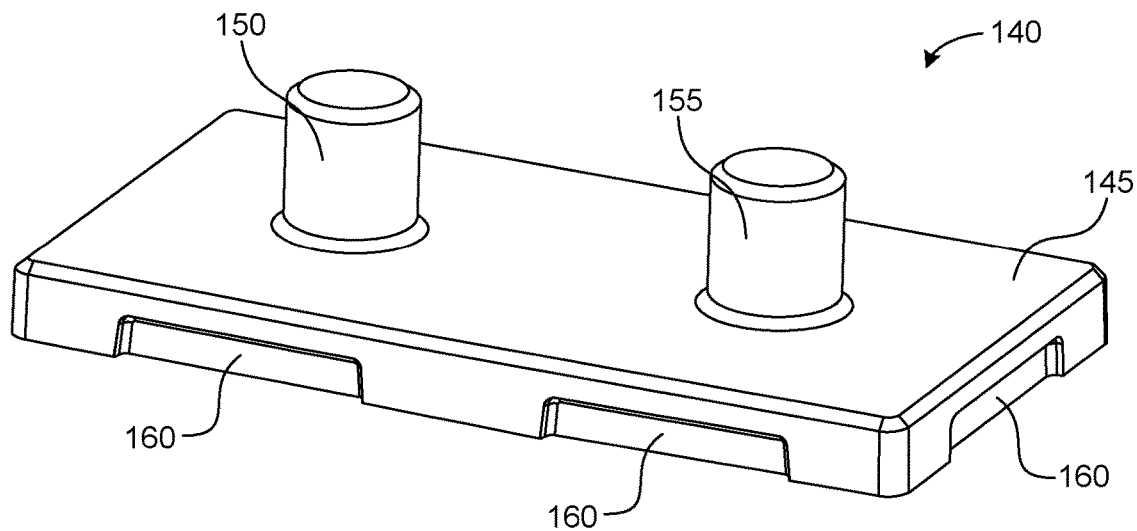
FIG. 1D is a schematic illustration of an example second tool organizer module constructed in accordance with teachings of this disclosure.

FIG. 1D is a schematic illustration of an example second tool organizer module 140 including an example base 145, rectangular in the example of FIG. 1D, defining a first example feature 150 and a second example feature 155. Each of the first feature 150 and the second feature 155 are configured to receive a portion of a tool, as is described above in relation to feature 110. In some examples, the first feature 150 and the second feature 155 are the same configuration. For example, the first feature 150 and the second feature 155 each include an approximately ⅜" square post to receive the square hole of tools 130 (e.g., ⅜" sockets) having different sizes. In some examples, the first feature 150 and the second feature 155 are different configurations. For example, the first feature 150 and the second feature 155 are sized to accommodate a 6-point or 12-point socket having different sizes (e.g., 10 mm, 13 mm).

Example recesses 160 are formed in one or more sides of the base 145 of the second tool organizer module 140. As noted above, the recesses 160 facilitate handling of the first tool organizer module 100 and/or facilitate removal of the first tool organizer module 100 from a tool organizer, enabling improved purchase of the edges of the base 105.

In some examples, the second tool organizer module 140 includes one or more magnets (not shown) retained within one or more openings in the base 145. In some examples, a first magnet is disposed in a first opening formed beneath the first feature 150 and a second magnet is disposed in a second opening formed beneath the second feature 155. In some examples, a single magnet is disposed in an opening in the base 145 that is adjacent the first feature 150 and the second feature 155, such as between the first feature 150 and the second feature 155. As noted above with respect to FIGS. 1A-1C, the magnet(s) may be retained within the opening(s) via an adhesive, an interference or friction fit, via a retainer (not shown) attached to a bottom of the base 145 and/or sides of the base 145. Alternatively, the magnet may be integrally formed within the second tool organizer module 140.

Similarly, in other examples, the second tool organizer module 140 may include three or more features 110. While the first feature 150 and the second feature 155 are shown to be aligned linearly along the base 145, the second tool organizer module 140 may include three or more features 110 that are not aligned and the base 145 may assume another geometry (e.g., triangular, square, round, etc.).

In some examples, the feature 110 of the first tool organizer module 100 and/or the second tool organizer module 140 may include a stake, pin or post about which the feature 110 is removably attached. For example, a user is permitted to remove a first feature 110 from the first tool organizer module 100 and replace it by attaching a second feature 110 to the stake, pin or post to reconfigure the first tool organizer module 100, if desired.

FIGS. 2A-2B are schematic illustrations of an example third tool organizer module 200. The third tool organizer module 200 includes an example base 202 defining an example feature 210 to receive a portion of a tool. In FIGS. 2A-2C, the base 202 is substantially rectangular. In some examples, the base 202 is square or substantially square.

In the third tool organizer module 200, the feature 210 includes a channel extending across the upper portion of the base 202. In the example of FIGS. 2A-2C, the channel includes sloped and convergent sides, with a first side 215 and a second side 220 angling downwardly from a first shoulder 222 and a second shoulder 224, respectively, at an upper portion of the base 202 to converge at an example valley 230. As shown in FIGS. 2A-2C, the base 202 is elongated along a direction of the feature 210 (e.g., along the channel).

FIG. 2B shows the third tool organizer module 200 in an inverted position. An example lower portion of the base 202 defines example openings 240 to receive example magnets 245 therein. While three openings 240 and three magnets 245 are shown in the example third tool organizer module 200, a greater number or a lesser number (e.g., one, two) of openings 240 and magnets 245 could be provided. As with the prior example of FIGS. 1A-1D, the magnets 245 are retained within the openings 240 via a friction fit or interference fit between a periphery of the magnets 245 and the surface of or surfaces of the openings 240. Likewise, in some examples, the magnets 245 are retained within the opening via an adhesive applied to the magnets 245 and/or the surface(s) of the openings 240 prior to insertion of the magnets 245 into the openings 240. Additionally, in some examples, a retainer (not shown) is attached to a bottom of the base 202 to retain the magnets 245 in the openings 240. In some examples, the retainer is connected to the bottom of the base 202 via an adhesive or via a snap-fit connection including one or more male-female connectors, such as is described above in relation to FIGS. 1A-1D. In some examples, the magnets 245 include a rare-earth magnet (e.g., a neodymium magnet, etc.), an Alnico alloy or a ferrite.

FIG. 2C shows an example tool 260, a screwdriver, moved into position on the feature 210, shown as a channel extending from a first end of the third tool organizer module 200 to a second end of the third tool organizer module 200. In this example, a magnetic force from the magnets 245 adheres the shank of the screwdriver to the valley 230 and/or the first side 215 and the second side 220 of the feature 210. In some examples, the tool 260 is itself ferrous, ferritic or magnetic, enhancing securement of the tool 260 within the feature 210. In some examples, the tool 260 includes an elongated metal tool, such as, but not limited to screw drivers, Torx drivers, socket drives, open and box-end wrenches, crescent wrenches or Allen wrenches.

In the example of FIGS. 2A-2C, as with the examples of FIGS. 1A-1D, the openings 240 are formed beneath the feature 210. In some examples, the openings 240 are formed adjacent the feature 210 (e.g., positioned adjacent a centerline or axis of the feature, etc.). For example, the magnets 245 could include bar magnets disposed in openings (not shown) beneath the first side 215 and the second side 220 or bar magnets integrally formed within the third tool organizer module 200.

Figure 3A:
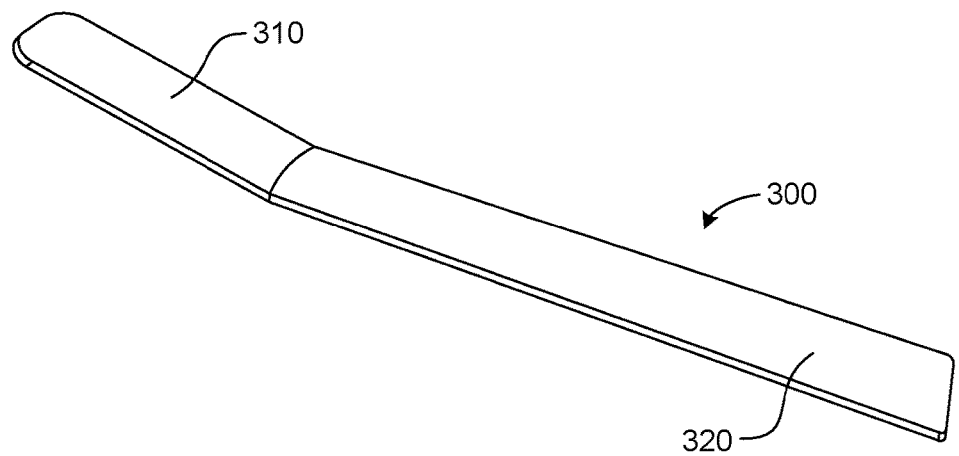
FIG. 3A is a schematic illustration of an example first tool organizer constructed in accordance with teachings of this disclosure.

FIG. 3A is a schematic illustration of an example first tool organizer 300. The first tool organizer 300 includes an example handle 310 and an example elongated substrate 320. In some examples, the elongated substrate 320 is formed from a ferromagnetic metal. In some examples, the elongated substrate 320 includes a ferromagnetic metal. For instance, in some examples, the elongated substrate 320 is formed from a stiff thermoplastic (e.g., a high-density polyethylene (HDPE), a homopolymer acetal, a copolymer acetal, etc.) having a ferromagnetic metal formed therein or disposed therein. In some examples, the elongated substrate 320 is in the form of an elongated bar.

The first tool organizer 300 is constructed to accommodate one or more tool organizer modules, such as one or more of the first tool organizer module 100, one or more of the second tool organizer module 140 and/or one or more of the third tool organizer module 200. The tool organizer module(s) may be removably attached to a surface of the elongated substrate 320 (e.g., a top surface and/or a bottom surface of the example elongated substrate 320 shown in FIG. 3A-3B) via a magnetic attraction between the magnet(s) (e.g., 125, 245, etc.) of the tool organizer module(s) (e.g., 100, 140, 200) and the ferromagnetic metal of the elongated substrate 320 of the first tool organizer 300. The elongated substrate 320 is advantageously dimensioned to accommodate a plurality of tool organizer modules (e.g., 100, 140, 200).

Figure 3B:
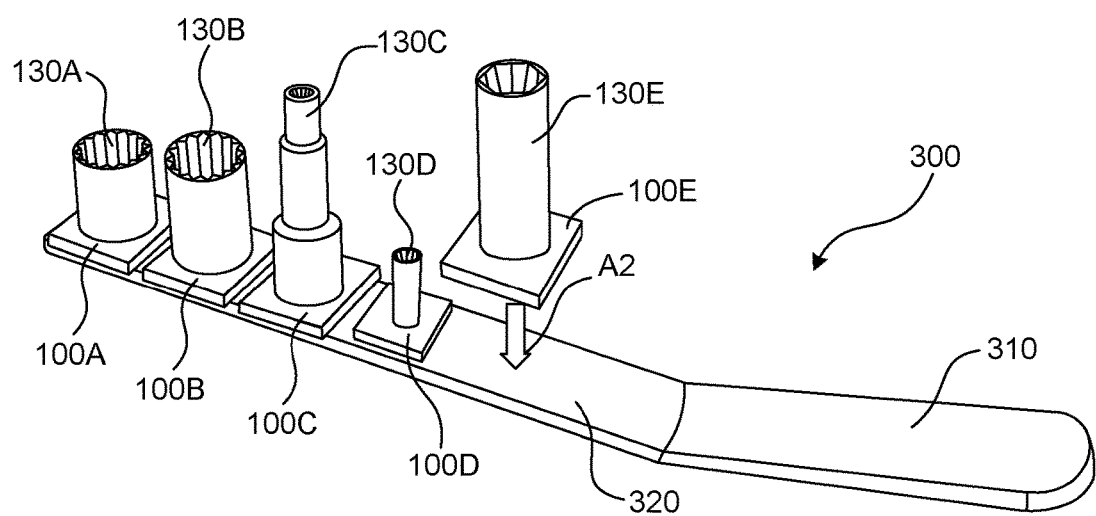
FIG. 3B is a schematic illustration of the example first tool organizer of FIG. 3A bearing a plurality of example first tool organizer modules of FIGS. 1A-1C constructed in accordance with teachings of this disclosure.

FIG. 3B shows the elongated substrate 320 of the first tool organizer 300 having a plurality of the first tool organizer modules 100, labeled as 100A-100C, attached to the elongated substrate 320 via a magnetic attraction between the magnets 125 of the first tool organizer modules 100A-100D and the ferromagnetic metal of the elongated substrate 320. FIG. 3B also shows another first tool organizer module 100, labeled as 100E, positioned over the elongated substrate 320 and moving toward the elongated substrate 320, as indicated by the arrow A2, where it will be attached, via a magnetic attraction between the magnets 125 of the first tool organizer modules 100A-100C and the ferromagnetic metal of the elongated substrate 320. On each of the first tool organizer modules 100A-100E are corresponding tools 130A-130E retained on the features 110 of each of the respective first tool organizer modules 100A-100E.

In some examples, the elongated substrate 320 includes connector elements (e.g., notches, male/female connectors, etc.) to permit attachment of an extender element to extend a length of the elongated substrate 320. The extender element enables additional tool organizer modules (e.g., first tool organizer modules 100A-100D, etc.) to be carried by the first tool organizer 300. In some examples the elongated substrate 320 is itself segmented into a plurality of sections that may be selectively used, or stowed, based on immediate needs of a user.

Figure 4A:
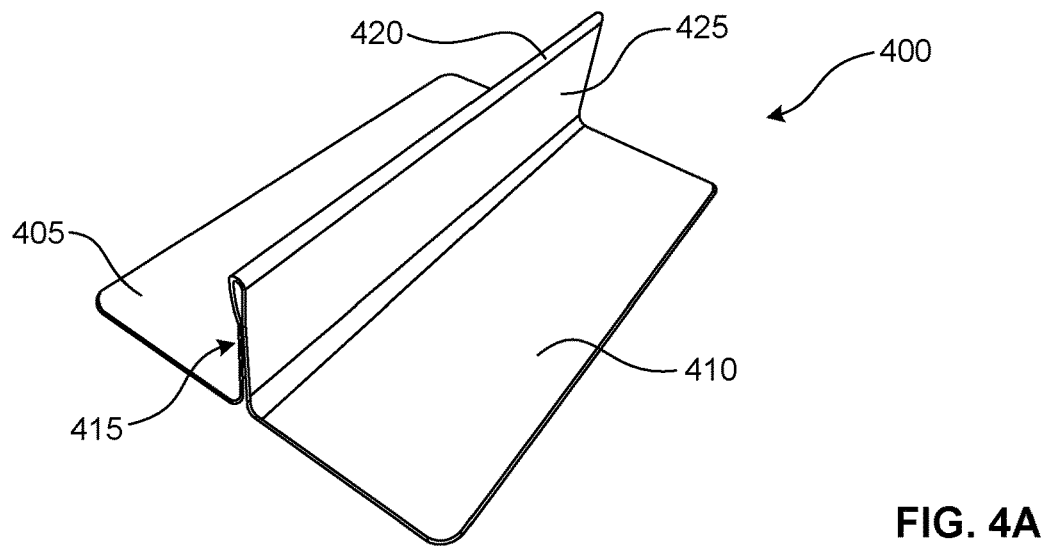
FIGS. 4A-4B are schematic illustrations of an example second tool organizer constructed in accordance with teachings of this disclosure.

FIG. 4A is a schematic illustration of an example second tool organizer 400. The second tool organizer 400 is in the form of an example bracket. In some examples, the second tool organizer 400 is in the form of an L-bracket. In some examples, the second tool organizer 400 is formed from a ferromagnetic metal. In some examples, the second tool organizer 400 includes a ferromagnetic metal. For instance, in some examples, the second tool organizer 400 is formed from a stiff thermoplastic (e.g., a high-density polyethylene (HDPE), a homopolymer acetal, a copolymer acetal, etc.) having a ferromagnetic metal formed therein or disposed therein.

The second tool organizer 400 is constructed to accommodate one or more tool organizer modules, such as one or more of the first tool organizer module 100, one or more of the second tool organizer module 140 and/or one or more of the third tool organizer module 200. The tool organizer module(s) may be removably attached to a surface of the second tool organizer 400 via a magnetic attraction between the magnet(s) (e.g., 125, 245, etc.) of the tool organizer module(s) (e.g., 100, 140, 200) and the ferromagnetic metal of the second tool organizer 400. For example, the tool organizer module(s) may be removably attached to an example upper surface of an example first part 405 or an example upper surface of an example second part 410. In some examples, the tool organizer module(s) may be removably attached to a fin 415, or vertical part of, the second tool organizer 400. For example, the tool organizer module(s) may be removably attached to an exterior surface of an example third part 420 and/or an exterior surface of an example fourth part 425. The second tool organizer 400 is advantageously dimensioned to accommodate a plurality of tool organizer modules (e.g., 100, 140, 200).

Figure 4B:
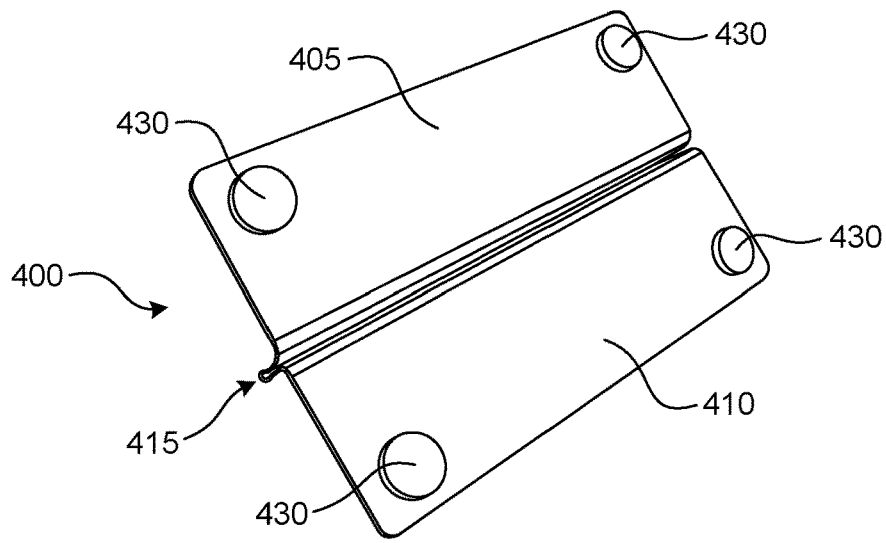

FIG. 4B shows the second tool organizer 400 in an inverted position to show a bottom portion of the second tool organizer 400. Attached to, or integrated with, the second tool organizer 400 are one or more magnets 430. In some examples, the one or more magnets 430 are attached to (e.g., mechanical fastener, adhesive, weld, etc.), or integrated with, an example lower surface of the first part 405 or an example lower surface of the second part 410.

Figure 4C:
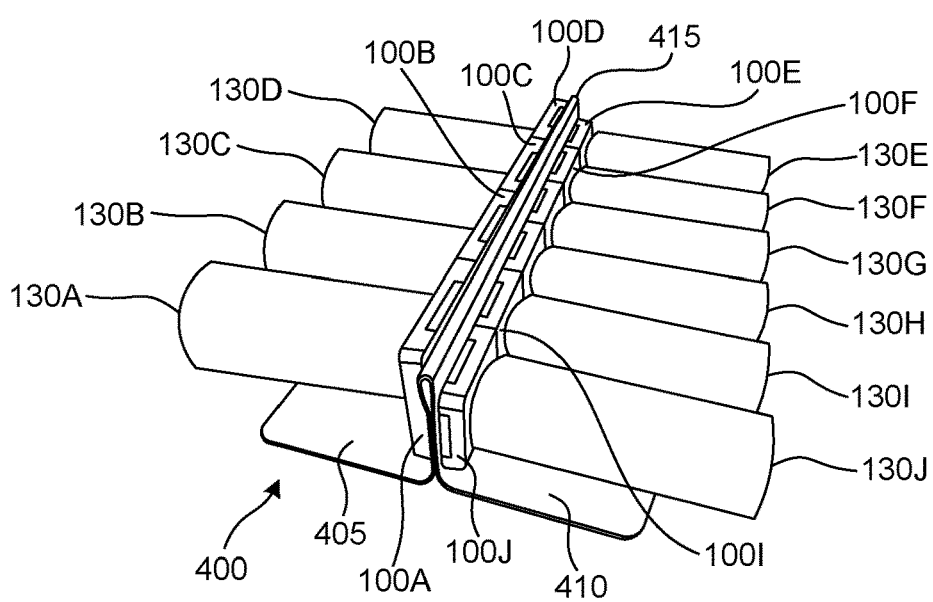
FIG. 4C is a schematic illustration of the example second tool organizer of FIGS. 4A-4B bearing a plurality of example first tool organizer modules of FIGS. 1A-1C constructed in accordance with teachings of this disclosure.

FIG. 4C shows the second tool organizer 400 having a plurality of the first tool organizer modules 100, labeled as 100A-100J, attached to the second tool organizer 400 via a magnetic attraction between the magnets 125 of the first tool organizer modules 100A-100C and the ferromagnetic metal of the second tool organizer 400. On each of the first tool organizer modules 100A-100J are corresponding tools 130A-130J retained on the features 110 (not shown) of each of the respective first tool organizer modules 100A-100J. One advantage of the horizontal placement of the first tool organizer modules 100A-100J orients the tools 130A-130J horizontally, which minimizes a vertical profile of the combination, facilitating placement of the second tool organizer 400 within a toolbox even when bearing tools 130A-130J (e.g., deep-well sockets, drive extensions, etc.) are too tall to stand vertically in a toolbox In some examples, the first tool organizer 300 and/or the second tool organizer 400 include one or more magnets, or a ferromagnetic material that is magnetized, and a base (e.g., 105, 145, 202) the first tool organizer module 100, the second tool organizer module 140 and/or the third tool organizer module 200 includes a ferromagnetic metal. In such examples, the first tool organizer 300 and/or the second tool organizer 400 include one or more magnets integrated therein (e.g., in one or more openings, adhesively attached to, welded to, etc.) and a base (e.g., 105, 145, 202) the first tool organizer module 100, the second tool organizer module 140 and/or the third tool organizer module 200 includes a ferromagnetic metal that is able to be magnetically adhered to the parts and/or surfaces of the first tool organizer 300 and/or the second tool organizer 400 corresponding to locations of the magnets. In such examples, the first tool organizer 300 and/or the second tool organizer 400 may advantageously be positioned on and adhered to surfaces adjacent a work site. For instance, an automobile mechanic may magnetically adhere one or more first tool organizers 300 and/or one or more second tool organizers 400 to an iron or steel component of an automobile in easy reach for a task at hand.

Figure 5:
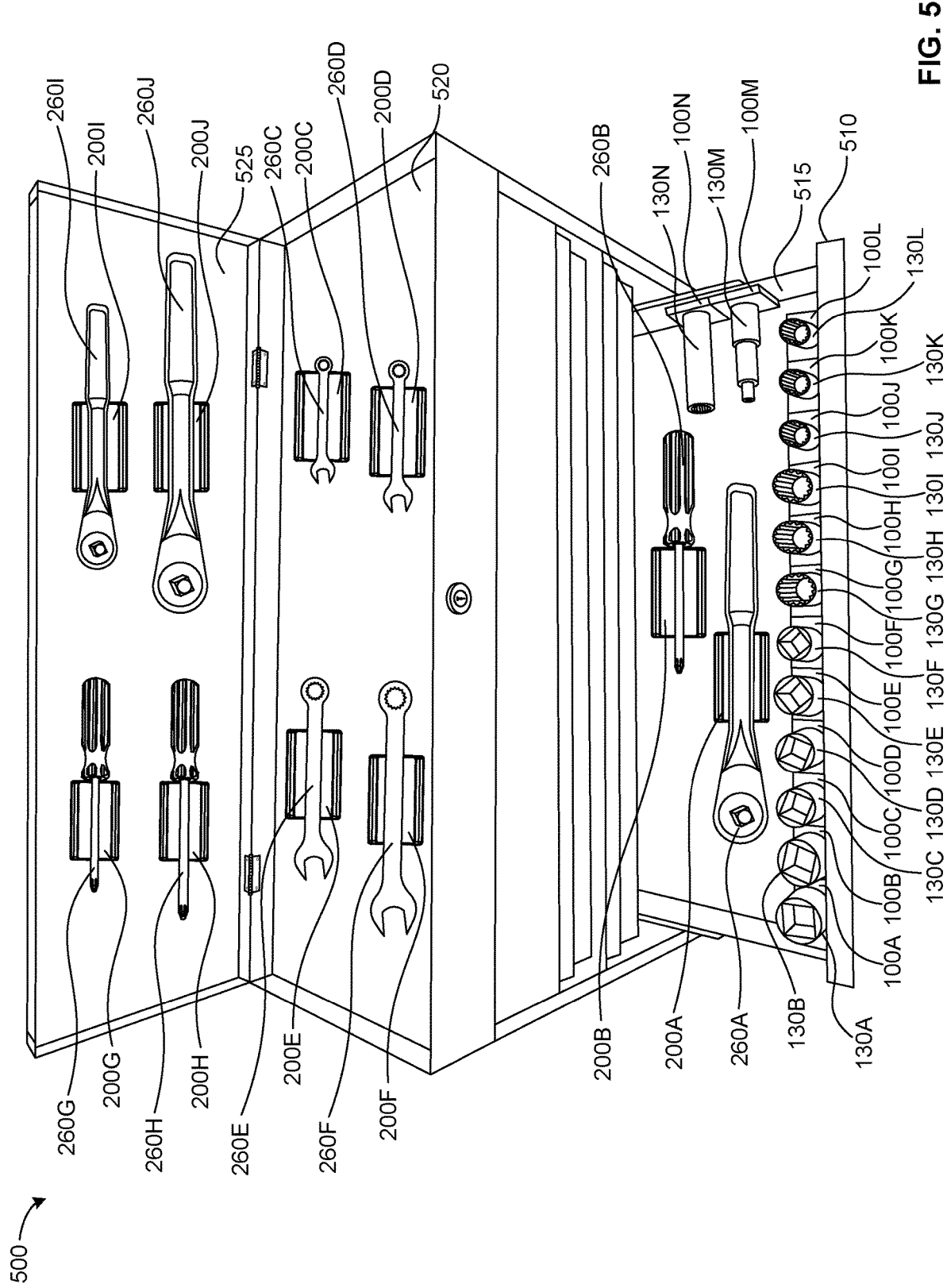
FIG. 5 is a schematic illustration of an example toolbox including example first tool organizer modules of FIGS. 1A-1C and example third tool organizer modules of FIGS. 2A-2C constructed in accordance with teachings of this disclosure.

FIG. 5 is a schematic illustration of an example toolbox 500 including first tool organizer modules 100A-100N of FIGS. 1A-1C bearing tools 130A-130N and third tool organizer modules 200A-200J of FIGS. 2A-2C bearing tools 260A-260J. FIG. 5 shows an example drawer 510 including first tool organizer modules 100A-100N of FIGS. 1A-1C bearing tools 130A-130N and third tool organizer modules 200A-200B of FIGS. 2A-2C bearing tools 260A-260B. The first tool organizer modules 100A-100L are magnetically adhered directly to the drawer 510. The first tool organizer modules 100M-100N are magnetically adhered directly to an example sidewall 515 of the drawer 510. The horizontal placement of the first tool organizer modules 100M-100N orients the tools 130M-130N horizontally, as the tools 130M-130N have a length that would not permit them to be oriented vertically within the drawer 510.

An example upper section 520 of the toolbox 500 has third tool organizer modules 200C-200F of FIGS. 2A-2C magnetically adhered to the upper section 520. The third tool organizer modules 200C-200F bear tools 260C-260F in the features 210 defined therein. An example lid 525 of the toolbox 500 has third tool organizer modules 200G-200J of FIGS. 2A-2C magnetically adhered to an underside of the lid 525. The third tool organizer modules 200G-200J bear tools 260G-260J in the features 210 defined therein. FIG. 5 illustrates the ability of the disclosed first tool organizer modules 100, second tool organizer modules 140 and third tool organizer modules 200 to advantageously utilize all available space in the toolbox, inclusive of the sides of drawers or trays and/or even on the underside of a lid of the toolbox 500.

Figure 6:
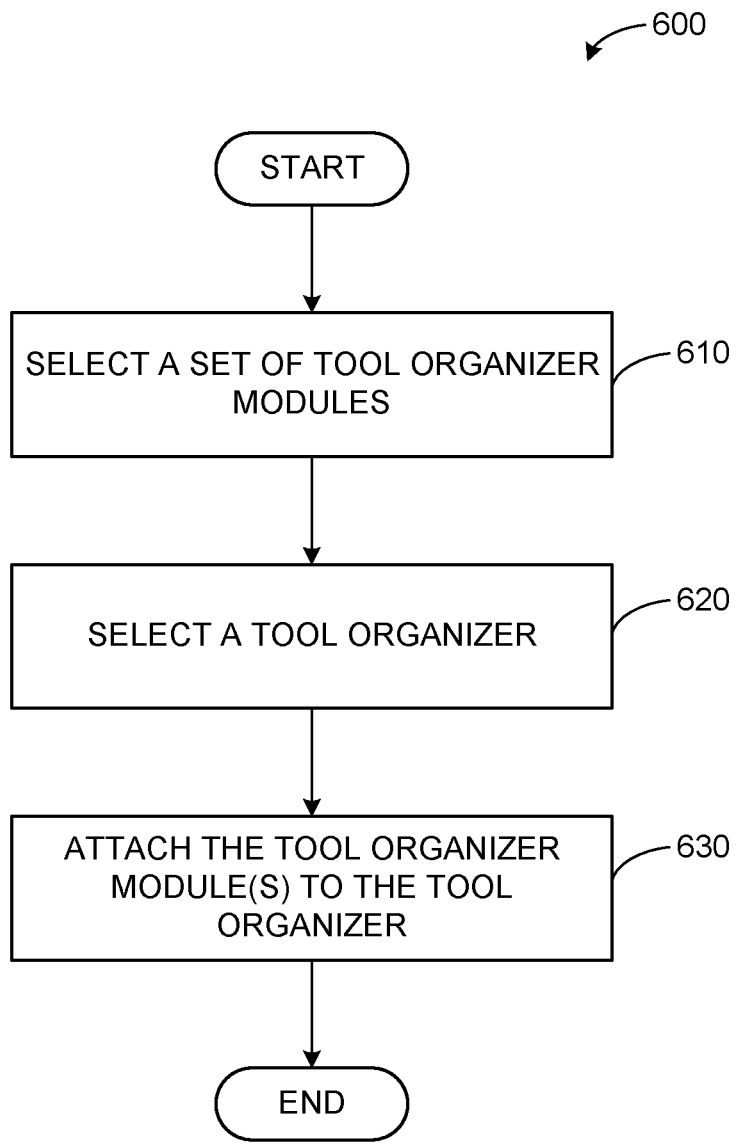
FIG. 6 is a flowchart illustrating an example use of the example first, second or third tool organizer modules in combination with the first or the second tool organizers in accordance with teachings of this disclosure.

FIG. 6 is a flowchart 600 illustrating an example use of the first tool organizer module 100, the second tool organizer module 140 and/or the third tool organizer module 200 in combination with the first tool organizer 300 or the second tool organizer 400. The flowchart starts at example block 610 with a selection of a set (i.e., one or more) of tool organizer modules. At block 610, a selection of a set of tool organizer modules is made from a population of tool organizer modules (e.g., one or more tool organizer modules) including one or more first tool organizer modules 100, one or more second tool organizer modules 140 and/or one or more third tool organizer modules 200.

At example block 620, a tool organizer is selected. Based on a number of and type of tool organizer module(s) selected at block 610, one or more tool organizers are selected to from a population of one or more first tool organizers 300 and/or one or more second tool organizers 400.

At example block 630, the selected tool organizer module(s) selected at block 610 are attached to the tool organizer(s) selected at block 620 via a magnetic adherence between the selected tool organizer module(s) and selected tool organizer(s).

In some examples, the first tool organizer module 100, the second tool organizer module 140 and/or the third tool organizer module 200 are color-coded to facilitate ready identification of tools 130, 260 borne thereby. For example, all tool organizer modules (100, 140, 200) are colored red to signify tools in English-units or Standard units and are colored blue to signify tools in Metric-units. Thus, even from afar, a user can determine whether a particular tool (e.g., a socket) is appropriate to a particular task without looking further at a label borne by the tool organizer modules or a label or etching on the tool.

In some examples, each tool organizer module (100, 140, 200) includes a label indicating the particular tool to which the tool organizer module is configured. For instance, in the example first tool organizer modules 100 of FIGS. 1A-1C, an annular label may be disposed about the feature 110 (e.g., a socket label of "16 mm 12 pt," "11/16 12 pt," "21 mm 6 pt," etc.). Thus, a set of example first tool organizer modules 100 for a ¼" drive (6 pt metric) could include ten first tool organizer modules 100, each with a ¼" square post feature 110, for a 5 mm, 5.5 mm, 6 mm, 7 mm, 9 mm, 10 mm, 11 mm, 12 mm, 13 mm and 14 mm. In another example, a set of example first tool organizer modules 100 for a ½" drive (12 pt metric) could include twelve first tool organizer modules 100, each with a ½" square post feature 110, for a 11 mm, 12 mm, 13 mm, 14 mm, 15 mm, 16 mm, 17 mm, 18 mm, 19 mm, 20 mm, 21 mm and 22 mm.

The disclosed examples of FIGS. 1A-5 illustrate a system of tool organizer modules (e.g., 100, 140, 200) and tool organizers (e.g., 300, 400) that are combinable in any manner to organize a toolbox and/or a workspace. The tool organizer modules (e.g., 100, 140, 200) and tool organizers (e.g., 300, 400), in combination, ensure that the tools (e.g., 130, 260) borne thereby stay in place even during transport or during use. For instance, the tool organizers (e.g., 300, 400), which may include magnets or may include magnetized material, are able to be adhered to any steel tool box, any steel tool box shelf, a variety of metal surfaces in a workshop, or a variety of metal surfaces inside a working vehicle such as a car, truck or tractor. The disclosed system of tool organizer modules (e.g., 100, 140, 200) and tool organizers (e.g., 300, 400) provide a modular system that is adaptable to the user's needs.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A stand-alone portable tool organizer module, comprising:
   a base including an opening formed at a first side of the base and a feature formed at a second side of the base, to receive a portion of a tool; and
   a magnet disposed in the opening of the base,
   wherein the feature includes a recession in the second side of the base, and
   wherein the magnet is configured to impart, on the second side of the base, a magnetic retention force at least substantially centered about the feature to retain the tool to the second side of the base in the feature for any orientation of the portable tool organizer module and is further configured to impart, on the first side of the base, a magnetic retention force to magnetically adhere the base to a selected surface for any orientation of the selected surface, including in a first orientation and a second orientation, different than the first orientation, for a selected surface comprising a movable surface.

2. The stand-alone portable tool organizer module of claim 1, wherein the feature includes a channel extending entirely across the second side of the base.

3. The stand-alone tool organizer module of claim 2, wherein the channel includes sloped sides.

4. The stand-alone tool organizer module of claim 2, wherein the base is elongated along a direction of the channel.

5. The stand-alone tool organizer module of claim 2, wherein the channel is polygonal in shape.

6. The stand-alone portable tool organizer module of claim 3, wherein the sloped sides of the channel are convergent.

7. The stand-alone tool organizer module of claim 2, wherein the channel is formed along a center-line of the second side of the base.

8. The stand-alone portable tool organizer module of claim 2, wherein the at least one opening comprises a plurality of spaced-apart openings on the first side of the base.

9. The stand-alone portable tool organizer module of claim 8, wherein a magnet is disposed in each of the plurality of spaced-apart openings.

10. The stand-alone portable tool organizer module of claim 9, wherein each magnet includes a rare-earth magnet, an Alnico alloy, or a ferrite.

11. The stand-alone portable tool organizer module of claim 1, wherein said any orientation of the portable tool organizer module comprises any orientation along any axis in three dimensions.

12. The stand-alone portable tool organizer module of claim 1, wherein the feature comprises recess formed at a central portion of the second side of the base, the recess being dimensioned to matingly and removably receive a portion of the tool.

13. The stand-alone portable tool organizer module of claim 1, wherein the feature comprises a polygonal recess formed at a central portion of the second side of the base, the polygonal recess being dimensioned to matingly and removably receive a portion of the tool.

14. The stand-alone portable tool organizer module of claim 1, wherein a lower portion of the base is constructed to receive a plurality of magnets and wherein the stand-alone portable tool organizer module comprises a plurality of magnets.

15. The stand-alone portable tool organizer module of claim 14, wherein the lower portion of the base defines a plurality of openings along a center-line of the base, each of the openings having one of the plurality of magnets disposed therein.

16. The stand-alone portable tool organizer module of claim 14, wherein the lower portion of the base defines a plurality of openings formed beneath or at least partially beneath the feature, each of the plurality of openings having one of the plurality of magnets disposed therein.

17. The stand-alone portable tool organizer module of claim 1, wherein the first orientation comprises an at least substantially vertical orientation and wherein the second orientation comprises an at least substantially horizontal orientation.

18. The stand-alone portable tool organizer module of claim 17, wherein a lateral dimension of the feature varies along at least a portion of a depth of the feature.

19. The stand-alone portable tool organizer module of claim 1, wherein a cross-section of the feature is at least substantially constant along substantially an entire length of the feature.

20. The stand-alone portable tool organizer module of claim 1, wherein the stand-alone portable tool organizer module is selectively positionable relative to the selected surface.

21. The stand-alone tool organizer module of claim 2, wherein the feature is shaped to receive a shank or a shaft of the tool.

* * * * *